United States Patent
Sato

(10) Patent No.: US 8,192,067 B2
(45) Date of Patent: Jun. 5, 2012

(54) BACKLIGHT UNIT AND LIQUID CRYSTAL DISPLAY APPARATUS HAVING LIGHT GUIDING MEMBER, PRISM SHEET AND REFLECTION SECTION

(75) Inventor: Takashi Sato, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 377 days.

(21) Appl. No.: 11/795,245

(22) PCT Filed: Feb. 10, 2006

(86) PCT No.: PCT/JP2006/302352
§ 371 (c)(1),
(2), (4) Date: Jul. 13, 2007

(87) PCT Pub. No.: WO2006/092944
PCT Pub. Date: Sep. 8, 2006

(65) Prior Publication Data
US 2009/0097275 A1     Apr. 16, 2009

(30) Foreign Application Priority Data
Mar. 1, 2005   (JP) ................................. 2005-055401

(51) Int. Cl.
*F21V 7/04*       (2006.01)
*G02F 1/13357*    (2006.01)
(52) U.S. Cl. .................. 362/626; 362/620; 362/623
(58) Field of Classification Search .......... 362/623–626, 362/618–620; 349/61, 62, 65, 67
See application file for complete search history.

(56) References Cited

U.S. PATENT DOCUMENTS
5,202,950 A  *  4/1993  Arego et al. ................. 385/146
(Continued)

FOREIGN PATENT DOCUMENTS
JP           05-346577        12/1993
(Continued)

OTHER PUBLICATIONS

JPO and INPIT English translation of JP,2002-109932A, pp. 1-10. Apr. 2002.*

(Continued)

*Primary Examiner* — Alan Cariaso
(74) *Attorney, Agent, or Firm* — Nixon & Vanderhye P.C.

(57) ABSTRACT

A backlight unit (110) according to the present invention includes: a light source (102) for emitting light; a light guiding member (103) for receiving light emitted from the light source (102) at an end face (103c), and propagating the received light in a first direction (P); a prism sheet (104) disposed at the front face (103a) of the light guiding member (103); and a reflection section (105) disposed at the rear face (103b) side of the light guiding member (103), and the reflection section (105) has a reflection surface (105a) for light being emitted from the rear face (103b) of the light guiding member (103) and having a component in the first direction, the light being reflected toward the rear face (103b) of the light guiding member (103) as light having a component in a second direction which is the opposite direction to the first direction.

6 Claims, 12 Drawing Sheets

U.S. PATENT DOCUMENTS

| | | | |
|---|---|---|---|
| 5,303,322 A | | 4/1994 | Winston et al. |
| 5,414,599 A | * | 5/1995 | Kaneko et al. ............... 362/613 |
| 5,528,720 A | * | 6/1996 | Winston et al. ............... 385/146 |
| 5,818,555 A | * | 10/1998 | Yokoyama et al. ............. 349/67 |
| 5,914,760 A | * | 6/1999 | Daiku ........................... 362/623 |
| 6,330,047 B1 | | 12/2001 | Kubo et al. |
| 6,474,827 B2 | * | 11/2002 | Shinohara et al. ............ 362/607 |
| 6,667,782 B1 | * | 12/2003 | Taira et al. ..................... 349/65 |
| 6,791,639 B2 | * | 9/2004 | Colgan et al. .................. 349/95 |
| 6,827,458 B2 | * | 12/2004 | Suga .............................. 362/609 |
| 6,981,792 B2 | * | 1/2006 | Nagakubo et al. ............ 362/600 |
| 7,478,942 B2 | * | 1/2009 | Kim et al. ..................... 362/620 |
| 7,537,372 B2 | * | 5/2009 | Sugimoto et al. ............. 362/619 |

FOREIGN PATENT DOCUMENTS

| | | |
|---|---|---|
| JP | 10-228020 | 8/1998 |
| JP | 11-224058 | 8/1999 |
| JP | 2001-210122 | 8/2001 |
| JP | 2002-109932 | 4/2002 |

OTHER PUBLICATIONS

International Search Report for PCT/JP2006/302352, mailed Mar. 28, 2006.

International Preliminary Report on Patentability mailed Sep. 20, 2007 in corresponding PCT Application No. PCT/JP2006/302352.

* cited by examiner (a)

(b)

(a)

(b)

(a)

(b)

(a)

(b)

BACKLIGHT UNIT AND LIQUID CRYSTAL DISPLAY APPARATUS HAVING LIGHT GUIDING MEMBER, PRISM SHEET AND REFLECTION SECTION

This application is the U.S. national phase of International Application No. PCT/JP2006/302352 filed 10 Feb. 2006, which designated the U.S. and claims priority to JP 2005-055401, filed 1 Mar. 2005, the entire contents of each of which are hereby incorporated by reference.

TECHNICAL FIELD

The present invention relates to a backlight unit and a liquid crystal display apparatus having the backlight unit.

BACKGROUND ART

A liquid crystal display apparatus performs displaying by varying the optical anisotropy of a liquid crystal layer, and thus varying the transmittance of light, in accordance with a voltage which is applied across the liquid crystal layer. Depending on the light which enters the liquid crystal layer when displaying, liquid crystal display apparatuses are generally classified into three types. The three types of liquid crystal display apparatuses are: transmission type liquid crystal display apparatuses, reflection type liquid crystal display apparatuses, and transflective type liquid crystal display apparatuses.

In a transmission type liquid crystal display apparatus, a backlight is disposed on the back face of a liquid crystal display device, and light from the backlight is transmitted through the liquid crystal display device so as to be perceived by the user. In a reflection type liquid crystal display apparatus, incident light through the front face is reflected by a liquid crystal display device so as to be perceived by the user. A transflective type liquid crystal display apparatus functions in a similar manner to either a transmission type liquid crystal display apparatus or a reflection type liquid crystal display apparatus, depending on the environment of use. Specifically, in an environment where externally-entering light is strong, a transflective type liquid crystal display apparatus functions similarly to a reflection type liquid crystal display apparatus; and in an environment where externally-entering light is weak, the backlight is activated, and the transflective type liquid crystal display apparatus functions similarly to a transmission type liquid crystal display apparatus. Alternatively, irrespective of the intensity of externally-entering light, a transflective type liquid crystal display apparatus performs displaying simultaneously in the two modes, i.e., a transmissive mode and a reflective mode.

In the following description, a transflective type liquid crystal display apparatus will be exemplified as a liquid crystal display apparatus.

In a commonly-used transflective type liquid crystal display apparatus, the efficiency of utilization of light from the backlight is not so high because reflection electrodes are provided. Therefore, in order to obtain the same luminance as that of a transmission type liquid crystal display apparatus which is similar in construction to the transflective type liquid crystal display apparatus, it is necessary to increase the light intensity of the backlight, thus resulting in a large power consumption. Moreover, if the regions in which transmission apertures for transmitting the light from the backlight are formed are increased, the efficiency of utilization of light from the backlight can be enhanced, but in this case the regions in which the reflection electrodes are formed are decreased, thus resulting in a low efficiency of utilization of external light.

Therefore, in a conventional liquid crystal display apparatus, a microlens array is provided between the liquid crystal display device and the backlight unit (Patent Document 1). In this liquid crystal display apparatus, a microlens array converges light at transmission apertures of a liquid crystal display device, whereby the efficiency of utilization of light is enhanced and thus an appropriate luminance can be obtained without increasing power consumption.

In another conventional liquid crystal display apparatus, a prism sheet having a sawteeth-shaped prism surface is provided on a backlight unit (Patent Document 2).

FIG. 16(a) is a schematic cross-sectional view of a backlight unit 310 which is disclosed in Patent Document 2.

The backlight unit 310 includes: a surface light source 301 for emitting light; a prism sheet 304 for reflecting light from the surface light source 301 in the surface normal direction; and a reflector 305 which is disposed on the opposite side of the surface light source 301 from the prism sheet 304.

The surface light source 301 includes: a light source 302 for emitting light; a reflection member 302a provided so as to surround the light source 302; and a light guiding member 303 for receiving the light emitted from the light source 302 and propagating the received light. The reflection member 302a reflects the light emitted from the light source 302 toward the light guiding member 303, and allows the light from the light source 302 to efficiently enter the light guiding member 303.

The light guiding member 303 includes: a principal face (front face) 303a opposing the prism sheet 304; a principal face (rear face) 303b opposing the reflector 305; and an end face 303c which connects the front face 303a to the rear face 303b. The end face 303c of the light guiding member 303 receives the light emitted from the light source 302, such that the light propagates in a propagation direction P while being repetitively reflected between the front face 303a and the rear face 303b of the light guiding member 303. The front face 303a of the light guiding member 303 is parallel to the propagation direction P. As shown in FIG. 17, the rear face 303b of the light guiding member 303 includes regions which are tilted by a tilt angle α with respect to the propagation direction P.

FIG. 16(a) is referred to again. The prism sheet 304 is disposed at the front face 303a side of the light guiding member 303. The prism sheet 304 has a sawteeth-shaped prism surface, the prism surface having alternately-disposed prism slopes 304a and second prism slopes 304b. The prism surface of the prism sheet 304 opposes the front face 303a of the light guiding member 303. Ridges 304c are formed at boundaries between the first prism slopes 304a and the second prism slopes 304b. In the prism sheet 304, as shown in FIG. 18, each vertex angle between a first prism slope 304a and a second prism slope 304b is θ.

FIG. 16(a) is referred to again. In the backlight unit 310, light emitted from the light source 302 enters the light guiding member 303, and propagates inside the light guiding member 303 in the propagation direction P.

As shown by the broken line of FIG. 19, when light enters an interface between the front face 303a of the light guiding member 303 and the air at an incident angle which is smaller than a predetermined incident angle (angle of total reflection), a portion of the light is refracted at the interface between the front face 303a and the air so as to be emitted forward, and a portion of the light is reflected at the interface between the front face 303a and the air.

On the other hand, as shown by a solid line in FIG. 19, when light enters the interface between the front face 303a of the light guiding member 303 and the air at an incident angle which is equal to or greater than the angle of total reflection, the light is totally reflected.

FIG. 16(a) is referred to again. The light which has been refracted at the interface between the front face 303a of the light guiding member 303 and the air enters the prism sheet 304, and is reflected in the surface normal direction by the prism sheet 304.

Moreover, the light which has been reflected at the interface between the front face 303a of the light guiding member 303 and the air travels toward the rear face 303b of the light guiding member 303, and the light which is refracted at the interface between the rear face 303b of the light guiding member 303 and the air is emitted rearward, so as to strike the reflector 305. This light is reflected by the reflector 305, and again enters the rear face 303b of the light guiding member. Thereafter, the light is emitted forward from the front face 303a, enters the prism sheet 304, and is reflected by the prism sheet 304 in the surface normal direction.

Thus, in the backlight unit 310, the light which has once been emitted from the rear face 303b of the light guiding member 303 is reflected by the reflector 305 so as to be used for displaying, whereby the efficiency of utilization of light from the light source 302 can be enhanced. Moreover, since the prism sheet 304 is provided in the backlight unit 310, highly-directional light can be emitted for a liquid crystal display device (not shown).

[Patent Document 1] Japanese Laid-Open Patent Publication No. 11-109417

[Patent Document 2] Japanese Laid-Open Patent Publication No. 11-224058

DISCLOSURE OF INVENTION

Problems to be Solved by the Invention

However, a sufficient luminance may not be obtained even by using a microlens array.

Moreover, when the conventional backlight unit 310 is used for a liquid crystal display apparatus, moiré fringes may occur during displaying by the liquid crystal display apparatus.

As shown in FIG. 16(a), the light which is emitted forward from the front face 303a of the light guiding member 303 enters into the prism sheet 304, and is reflected by the second prism slopes 304b of the prism sheet 304 so as to be emitted off the prism sheet 304 in the surface normal direction.

Moreover, the light which is emitted rearward from the rear face 303b of the light guiding member 303 is reflected by the reflector 305, and becomes light having a component in a direction toward the rear face 303b of the light guiding member 303, so as to again enter the light guiding member 303. The light having entered the light guiding member 303 is finally emitted forward from the front face 303a of the light guiding member 303. The light emitted forward from the front face 303a of the light guiding member 303 enters into the prism sheet 304, and is reflected by the second prism slopes 304b of the prism sheet 304, so as to be emitted off the prism sheet 304 in the surface normal direction.

Thus, in the conventional backlight unit 310, both the light emitted from the light guiding member 303 without going via the reflector 305 and the light emitted from the light guiding member 303 via the reflector 305 are reflected by the second prism slopes 304b of the prism sheet 304. In other words, only the second prism slopes 304b of the prism sheet 304 contribute to the emission of light in the surface normal direction. Therefore, the intensity of the light which is reflected by the second prism slopes 304b is different from the intensity of the light reflected by the first prism slopes 304a.

FIG. 16(b) is a schematic diagram showing the intensity of the light emitted from the conventional backlight unit 310. In FIG. 16(b), out of the light emitted from the backlight unit 310, the intensity of the light reflected by the first prism slopes 304a of the prism sheet 304 corresponds to reference numeral A, whereas the intensity of the light reflected by the second prism slopes 304b of the prism sheet 304 corresponds to reference numeral B. In the conventional backlight unit 310, both the light traveling via the reflector 305 and the light not traveling via the reflector 305 are reflected by the second prism slopes 304b of the prism sheet 304, so that the intensity of the light ascribable to the second prism slopes 304b (corresponding to reference numeral B) is greater than the intensity of the light ascribable to the first prism slopes 304a (corresponding to reference numeral A). Thus, the light which is emitted from the prism sheet 304 has bright-dark fringes corresponding to the pitch of the prism sheet 304.

Consequently, a conventional liquid crystal display apparatus employing the backlight unit 310 performs displaying by using light which has bright-dark fringes, and therefore moiré fringes will occur during displaying by the liquid crystal display apparatus.

As a method for eliminating such moiré fringes, methods such as providing a diffusion layer for diffusing the light which is gathered at the transmission apertures of the liquid crystal display device (not shown) are known. However, providing a diffusion layer invites the problems of reduced frontal luminance and reduced displaying contrast.

An objective of the present invention is to provide a backlight unit which prevents bright-dark fringes in the emitted light, and a liquid crystal display apparatus having the backlight unit.

Means for Solving the Problems

A backlight unit according to the present invention comprises: a light source for emitting light; a light guiding member having a front face, a rear face, and an end face, the light guiding member receiving the light emitted from the light source at the end face and propagating the received light in a first direction; a prism sheet disposed at the front face side of the light guiding member; and a reflection section disposed at the rear face side of the light guiding member, wherein, the reflection section has a reflection surface for reflecting light being emitted from the rear face of the light guiding member and having a component in the first direction, the light being reflected toward the rear face of the light guiding member as light having a component in a second direction, the second direction being an opposite direction to the first direction; and the light guiding member emits the light having the component in the first direction and the light having the component in the second direction from the front face toward the prism sheet.

In one embodiment, the reflection surface includes: a first reflection surface for reflecting the light emitted from the rear face of the light guiding member as light having a component in a direction toward the rear face of the light guiding member; and a second reflection surface for reflecting the light emitted from the rear face of the light guiding member as light having a component in the second direction.

In one embodiment, an angle between the first direction and a normal direction of each of the first reflection surface and the second reflection surface is greater than 0° and less than 90°.

In one embodiment, the reflection section is a sloped reflector or a portion of a sloped reflector; and the sloped reflector has a surface including the reflection surface.

In one embodiment, the surface of the sloped reflector is formed so as to be sawteeth-shaped.

In one embodiment, an angle between a normal direction of the rear face of the light guiding member and the first direction is greater than 0° and less than 90°.

An liquid crystal display apparatus according to the present invention comprises the above backlight unit and a liquid crystal display device having transmission apertures.

In one embodiment, a microlens array for converging light at the transmission aperture of the liquid crystal display device is further comprised.

Effects of the Invention

With a backlight unit according to the present invention, bright-dark fringes are prevented from occurring in the light emitted from the backlight unit.

Moreover, with a liquid crystal display apparatus according to the present invention, moiré fringes are prevented from occurring during displaying by the liquid crystal display apparatus, whereby good displaying can be performed.

Figure 1:
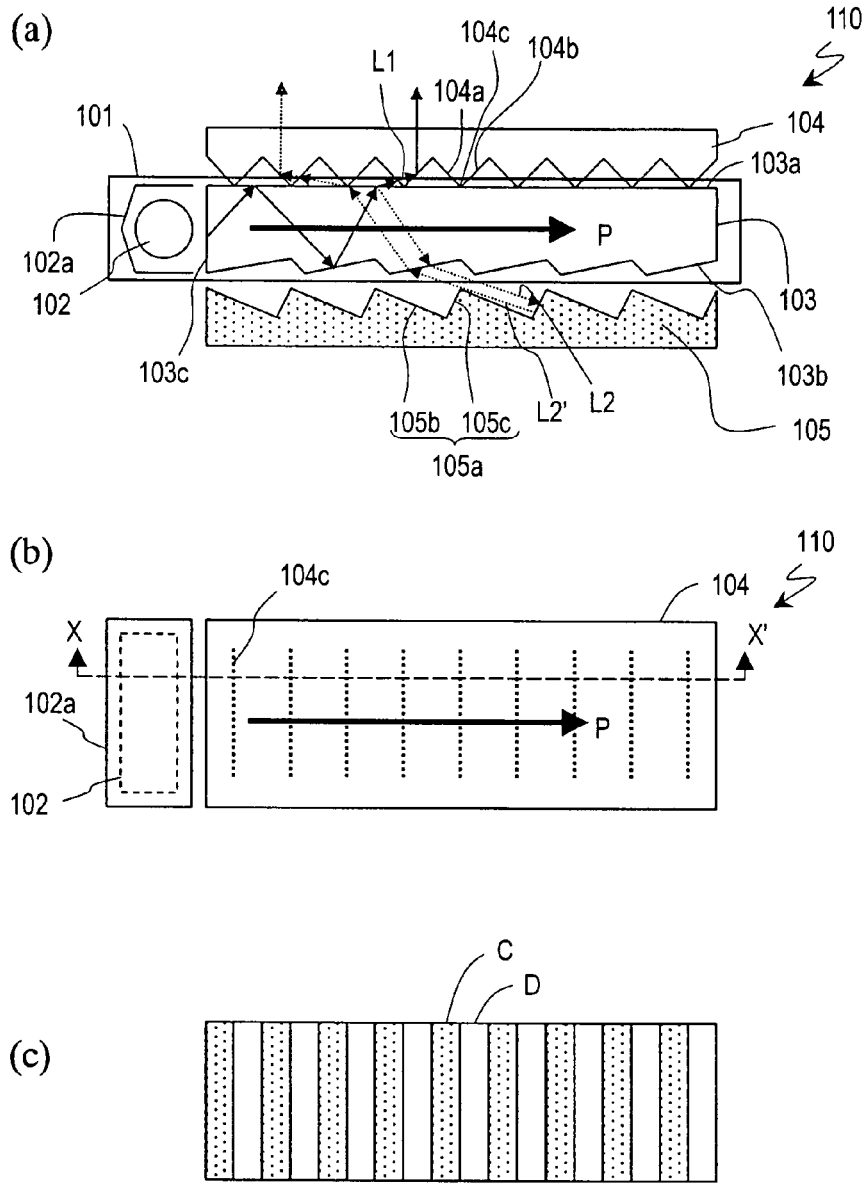
FIG. 1 Diagrams for describing an embodiment of a backlight unit according to the present invention, where: (a) is a schematic cross-sectional view of the backlight unit; (b) is a schematic plan view of the backlight unit; and (c) is a schematic diagram showing the intensity of light emitted from the backlight unit.

| DESCRIPTION OF THE REFERENCE NUMERALS | |
|---|---|
| 100 | liquid crystal display apparatus |
| 101 | surface light source |
| 102 | light source |
| 103 | light guiding member |
| 103a | principal face (front face) |
| 103b | principal face (rear face) |
| 104 | prism sheet |
| 105 | sloped reflector |
| 110 | backlight unit |
| 120 | polarizer |
| 122 | polarizer |
| 130 | microlens array |
| 140 | liquid crystal display device |
| 150 | active matrix substrate |
| 151 | transparent glass substrate |
| 152 | reflection electrode |
| 153 | transparent electrode |
| 154 | transmission aperture |
| 160 | liquid crystal layer |
| 170 | counter substrate |
| 171 | transparent glass substrate |
| 172 | transparent electrode |

BEST MODE FOR CARRYING OUT THE INVENTION

Hereinafter, with reference to the drawings, an embodiment of a backlight unit according to the present invention and a liquid crystal display apparatus having the backlight unit will be described. The liquid crystal display apparatus of the present embodiment is a transflective type liquid crystal display apparatus.

FIG. 1(a) is a schematic cross-sectional view of a backlight unit 110 of the present embodiment. FIG. 1(b) is a schematic plan view of the backlight unit 110. FIG. 1(a) is a cross-sectional view taken along line X-X' in FIG. 1(b).

Figure 16:
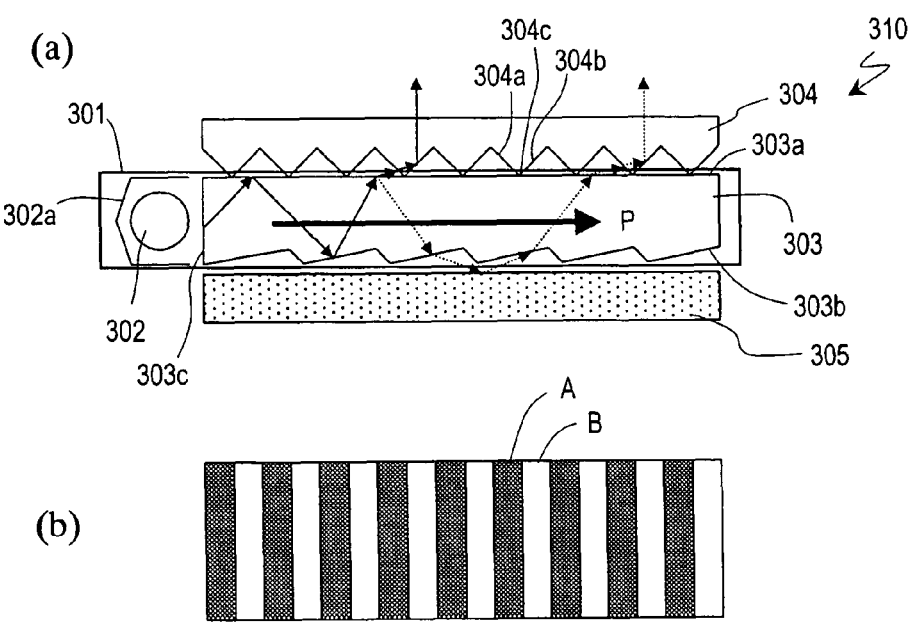
FIG. 16 Diagrams for describing a conventional backlight unit, where: (a) is a schematic cross-sectional view of the backlight unit; and (b) is a schematic diagram showing the intensity of light emitted from the backlight unit.
Figure 17:
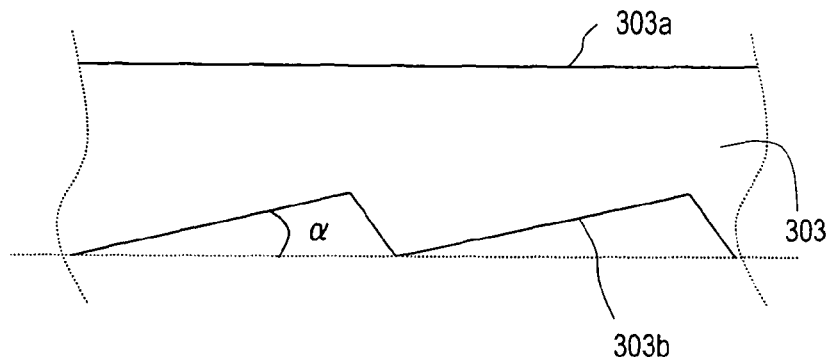
FIG. 17 A schematic cross-sectional view of a light guiding member in a conventional backlight unit.
Figure 18:
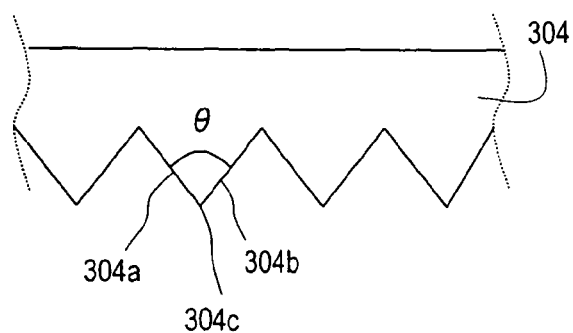
FIG. 18 A schematic cross-sectional view of a prism sheet in a conventional backlight unit.

As shown in FIG. 1(a), the backlight unit 110 differs from the conventional backlight unit 310 described with reference to FIG. 16(a) in that a sloped reflector 105 is comprised instead of the reflector 305.

The backlight unit 110 includes: a surface light source 101 for emitting light; a prism sheet 104 for reflecting light from the surface light source 101 in the surface normal direction; and a sloped reflector 105 which is disposed on the opposite side of the surface light source 101 from the prism sheet 104.

The surface light source 101 includes: a light source 102 for emitting light; a reflection member 102a provided so as to surround the light source 102; and a light guiding member 103 for receiving light emitted from the light source 102, and propagating the received light in a propagation direction (first direction) P. The light source 102 is a linear light source extending in a direction which is substantially orthogonal to the propagation direction P, as shown in FIG. 1(b). The reflection member 102a reflects the light emitted from the light source 102 toward the light guiding member 103, and allows the light from the light source 102 to efficiently enter the light guiding member 103.

Figure 2:
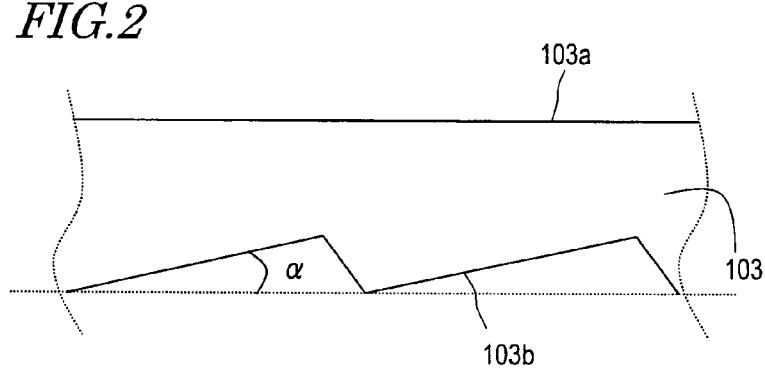
FIG. 2 A schematic cross-sectional view of a light guiding member in an embodiment of a backlight unit according to the present invention.

The light guiding member 103 includes: a principal face (front face) 103a opposing the prism sheet 104; a principal face (rear face) 103b opposing the reflector 105; and an end face 103c which connects the front face 103a to the rear face 103b. The end face 103c of the light guiding member 103 receives the light emitted from the light source 102, such that the light propagates in the propagation direction P while being repetitively reflected between the front face 103a and the rear face 103b of the light guiding member 103, as shown in FIG. 1(a) and FIG. 1(b). The front face 103a of the light guiding member 103 is parallel to the propagation direction P. As shown in FIG. 2, the rear face 103b of the light guiding member 103 includes regions which are tilted by a tilt angle α with respect to the propagation direction P, such that the angle between the normal direction of the rear face 103b of the light guiding member 103 and the propagation direction P is greater than 0° and less than 90°.

FIG. 1(a) is referred to again. The prism sheet 104 is disposed at the front face 103a side of the light guiding member 103. The prism sheet 104 has a sawteeth-shaped prism surface, the prism surface having alternately-disposed first prism slopes 104a and second prism slopes 104b. The prism surface of the prism sheet 104 opposes the front face 103a of the light guiding member 103. As shown in FIG. 1(b), ridges 104c are formed at boundaries between the first prism slopes 104a and the second prism slopes 104b.

The sloped reflector 105 is disposed at the rear face 103b of the light guiding member 103. The surface of the sloped reflector 105 that opposes the rear face 103b of the light guiding member 103 is a reflection surface 105a, the reflection surface 105a having alternately-disposed first reflection surfaces 105b and second reflection surfaces 105c. The first reflection surfaces 105b and the second reflection surfaces 105c are each tilted with respect to the propagation direction P; that is, the angle between the normal direction of each the first reflection surfaces 105b and the second reflection surfaces 105c and the propagation direction P is greater than 0° and less than 90°. The reflection surface 105a is formed so as to be sawteeth-shaped. On the reflection surface 105a of the sloped reflector 105, a dielectric reflection film, a metallic reflection film or the like is formed, for example.

Figure 19:
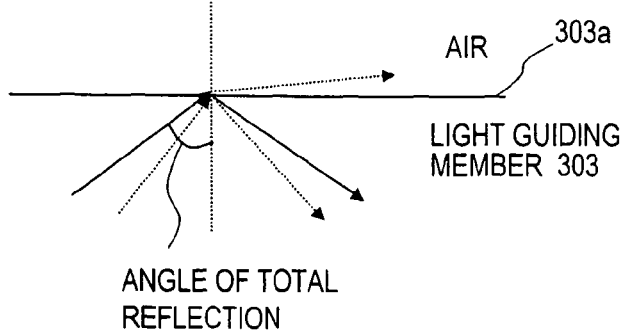
FIG. 19 A schematic diagram showing reflection and refraction of light in a commonly-used light guiding member.

Light from the light source 102 enters the light guiding member 103, and propagates inside the light guiding member 103 in the propagation direction P. As has been described above with reference to FIG. 19, inside the light guiding member 103, when light enters an interface between the front face 103a of the light guiding member 103 and the air at an incident angle which is smaller than a predetermined incident angle (angle of total reflection), a portion of the light is refracted at the interface between the front face 103a and the air so as to be emitted forward, and a portion of the light is reflected at the interface between the front face 103a and the air. On the other hand, when light enters the interface between front face 103a of the light guiding member 103 and the air at an incident angle which is equal to or greater than the angle of total reflection, the light is totally reflected.

The light which is emitted forward from the front face 103a of the light guiding member 103 will be designated as light L1. The light L1 has a component which is in the propagation direction P and in the direction from the light guiding member 103 toward the prism sheet 104. The light L1 having been emitted forward enters into the prism sheet 104, and is reflected by the second prism slopes 104b of the prism sheet 104 so as to be emitted off the prism sheet 104 in the surface normal direction.

On the other hand, the light which has been reflected at the interface between the front face 103a of the light guiding member 103 and the air travels toward the rear face 103b of the light guiding member 103, and the light which is refracted at the interface between the rear face 103b of the light guiding member 103 and the air is emitted rearward from the rear face 103b of the light guiding member 103. The light which is emitted rearward from the rear face 103b of the light guiding member 103 will be designated as light L2. The light L2 has a component which is in the propagation direction P and in the direction from the light guiding member 103 toward the sloped reflector 105. Once reflected by the second reflection surface 105c of the sloped reflector 105, the light L2 becomes light L2' having a component in the opposite direction to the propagation direction P. In the following descriptions of the present specification, the opposite direction to the propagation direction P may be referred to as a second direction. The light L2' having been reflected by the second reflection surface 105c of the sloped reflector 105 enters the light guiding member 103, and propagates within the light guiding member 103 in the second direction. Finally, from the front face 103a, the light guiding member 103 emits forward the light L2' having a component which is in the second direction and in the direction from the light guiding member 103 toward the prism sheet 104. The light L2' having been emitted forward enters into the prism sheet 104, and is reflected by the first prism slopes 104a of the prism sheet 104, so as to be emitted from the prism sheet 104 in the surface normal direction.

Thus, in the prism sheet 104, the first prism slopes 104a reflect the light L2' in the surface normal direction, whereas the second prism slopes 104b reflect the light L1 in the surface normal direction. Therefore, in accordance with the backlight unit 110 of the present embodiment, the intensity of the light which is reflected by the second prism slopes 104b is substantially the same as the intensity of the light which is reflected by the first prism slopes 104a.

FIG. 1(c) is a schematic diagram showing the intensity of the light emitted from the backlight unit 110 of the present embodiment. In FIG. 1(c), out of the light emitted from the backlight unit 110, the intensity of the light reflected by the first prism slope 104a of the prism sheet 104 corresponds to reference numeral C, whereas the intensity of the light reflected by the second prism slope 104b of the prism sheet 104 corresponds to reference numeral D. In the backlight unit 110, the light traveling via the sloped reflector 105 is reflected by the first prism slopes 104a of the prism sheet 104, whereas the light not traveling via the sloped reflector 105 is reflected by the second prism slopes 104b of the prism sheet 104. As a result, the difference between the intensity of the light ascribable to the second prism slopes 104b (corresponding to reference numeral D) and the intensity of the light ascribable to the first prism slopes 104a (corresponding to reference numeral C) is smaller than the difference in light intensity in the conventional backlight unit 310 having been described with reference to the FIG. 16(b). Preferably, there is no difference in light intensity in the backlight unit 110 of the present embodiment. Thus, hardly any bright-dark fringes corresponding to the pitch of the prism sheet 104 occur in the light which is emitted from the prism sheet 104, and preferably uniform light is emitted from the prism sheet 104.

In the backlight unit 110, the rear face 103b of the light guiding member 103 includes regions which are tilted by the tilt angle α with respect to the propagation direction P, as shown in FIG. 2. Herein, the tilt angle α is non-zero. In this case, even if the incident angle of the light which enters the interface between the front face 103a of the light guiding member 103 and the air is greater than the angle of total reflection so that this light is totally reflected, it is reflected, after the total reflection, by the rear face 103b of the light guiding member 103. As a result, the incident angle of the light which again enters the front face 103a of the light guiding member 103 becomes smaller than the angle of total reflection, so that a portion of the light is emitted from the front face 103a of the light guiding member 103. The tilt angle α of the rear face 103b is 120, for example.

Figure 3:
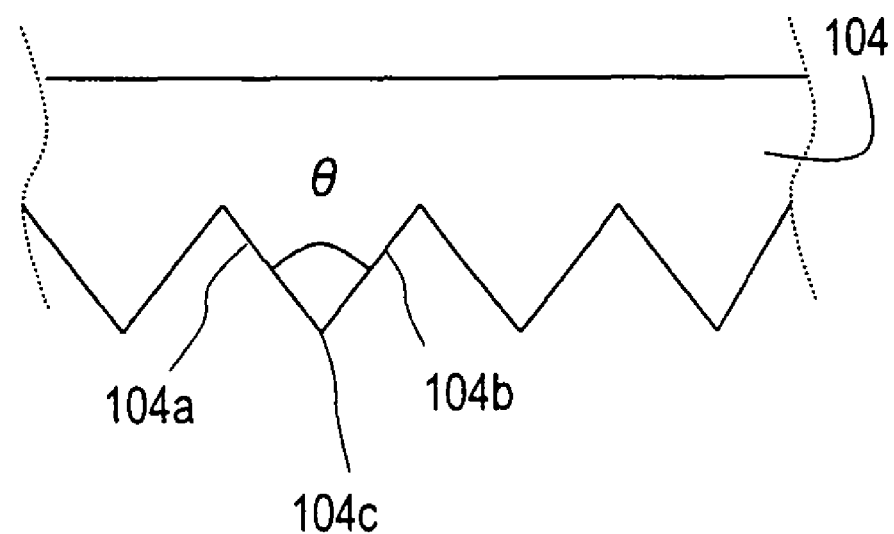
FIG. 3 A schematic cross-sectional view of a prism sheet in an embodiment of a backlight unit according to the present invention.

As shown in FIG. 3, in the prism sheet 104 of the backlight unit 110, each vertex angle between a first prism slope 104a and a second prism slope 104b is θ. The vertex angle θ of the prism sheet 104 is 62°, for example, and the pitch of the prism sheet 104 is 30 μm, for example. The ridges 104c are formed at the boundaries between the first prism slopes 104a and the second prism slopes 104b, and as shown in FIG. 1(b), the direction in which the ridges 104c extend intersects the propagation direction P of light, and is preferably orthogonal thereto.

Figure 4:
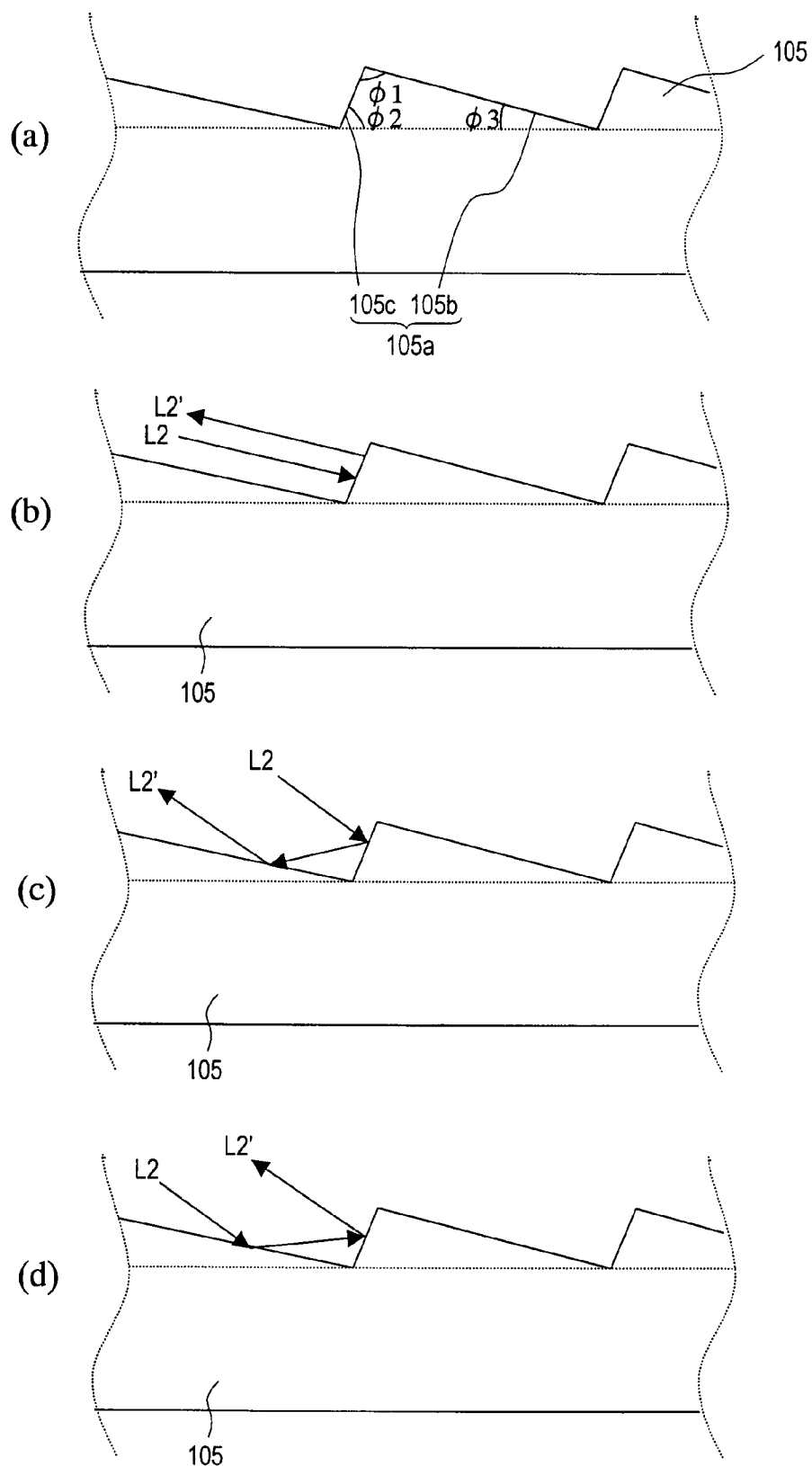
FIG. 4 (a) to (d) are diagrams for explaining light reflection by a sloped reflector in a backlight unit according to the present invention.

Moreover, as shown in FIG. 4(a), each triangle in the sawteeth-shaped cross section of the sloped reflector 105 has a vertex angle $\phi 1$, a base angle $\phi 2$, and a base angle $\phi 3$, where $\phi 1 + \phi 2 + \phi 3 = 180°$. The base angle $\phi 2$ is an angle which is more toward the light source 102 than is the base angle $\phi 3$.

As shown in FIG. 4(b), the angles of the vertex angle $\phi 1$, the base angle $\phi 2$, and the base angle $\phi 3$ are prescribed so that the principal ray of the light L2 strikes each second reflection surface 105c of the sloped reflector 105 at an incident angle of substantially 0°. As a result, the area of the first reflection surface 105b provided between the vertex angle $\phi 1$ and the base angle $\phi 3$ is greater than the area of the second reflection surface 105c provided between the vertex angle $\phi 1$ and the base angle $\phi 2$, the base angle $\phi 2$ being greater than the base angle $\phi 3$.

Moreover, even in the case where the light L2 strikes a second reflection surface 105c of the sloped reflector 105 at an incident angle other than 0°, as shown in FIG. 4(c), the light L2 is reflected by the second reflection surface 105c, thus becoming light having a component in the second direction, and then is reflected by a first reflection surface 105b, thus becoming light having a component in the direction toward the rear face 103b of the light guiding member 103. The light L2' having been reflected by the first reflection surface 105b again enters the light guiding member 103. Alternatively, as shown in FIG. 4(d), the light L2 is reflected by a first reflection surface 105b, thus becoming light having a component in the direction toward the rear face 103b of the light guiding member 103, and then is reflected by a second reflection surface 105c, thus becoming light L2' having a component in the second direction. The light L2' having been reflected by the second reflection surface 105c again enters the light guiding member 103.

Thus, also through a plurality of times of reflection, the reflection surface 105a of the sloped reflector 105 converts the light having a component in the first direction and in the direction toward the sloped reflector 105 into light having a component in the direction toward the rear face 103b of the light guiding member 103 and in the second direction.

The vertex angle $\phi 1$, the base angle $\phi 2$, and the base angle $\phi 3$ of the sloped reflector 105 are such that: the vertex angle $\phi 1 = 88°$; the base angle $\phi 2 = 78°$; and the base angle $\phi 3 = 14°$, for example. However, these angles are only exemplary. In the case where the rear face 103b of the light guiding member 103 has a tilt angle α of 12°, they may be in the ranges such that $\phi 1 \geq 84°$; $\phi 2 \geq 72°$; and $14° \leq \phi 3 \leq 22°$. In general, it is preferable that the vertex angle $\phi 1$, the base angle $\phi 2$, and the base angle $\phi 3$ respectively satisfy $\phi 1 \geq 72° + \alpha$, $\phi 2 \geq 84° - \alpha$, and $14° \leq \phi 3 \leq 22°$.

The pitch of the light guiding member 103 may differ depending on the size of the light guiding member 103. However, in order to ensure uniform luminance of the light emitted from the front face 103a of the light guiding member 103, the pitch of the light guiding member 103 is made relatively long at the end face 103c where the light is received, and the pitch of the light guiding member 103 becomes shorter away from the end face 103c. For example, in a 5-cm light guiding member 103, the pitch of the light guiding member 103 varies from 200 μm to 10 μm. The pitch of the prism sheet 104 is from 10 μm to 50 μm, for example, and the pitch of the sloped reflector 105 is in the range from 30 μm to 200 μm. Note that the pitches of the light guiding member 103, the prism sheet 104, and the sloped reflector 105 are mainly determined based on ease of production.

Each of the first reflection surfaces 105b and the second reflection surfaces 105c is a rectangular face extending in a direction which is substantially parallel to the direction in which the ridges 104c of the prism sheet 104 extend.

Figure 5:
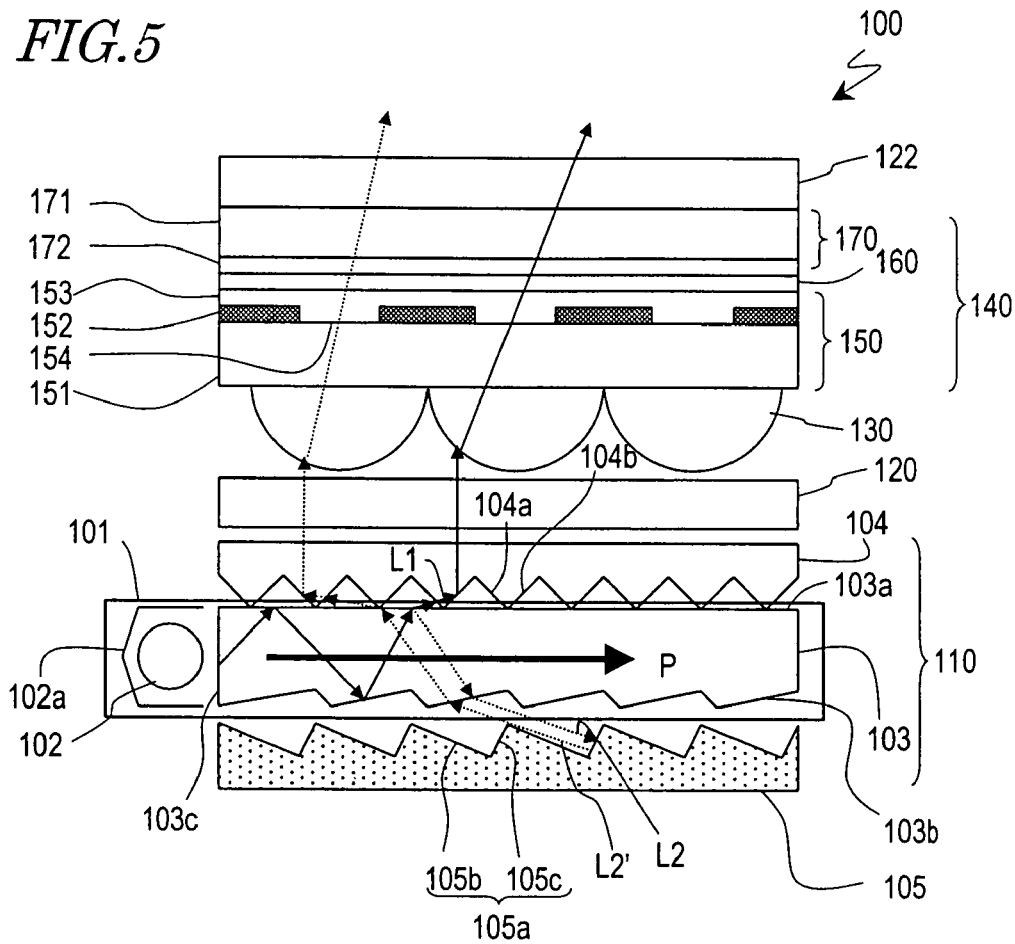
FIG. 5 A schematic cross-sectional view showing an embodiment of a liquid crystal display apparatus according to the present invention.

FIG. 5 is a schematic cross-sectional view of a liquid crystal display apparatus 100 according to the present embodiment. The liquid crystal display apparatus 100 of the present embodiment is a transflective type liquid crystal display apparatus having the backlight unit 110.

The liquid crystal display apparatus 100 includes the backlight unit 110, a pair of polarizers 120 and 122, a microlens array 130, and a liquid crystal display device 140. The microlens array 130 is interposed between the backlight unit 110 and the liquid crystal display device 140, whereas the polarizer 120 is interposed between the backlight unit 110 and the microlens array 130. Moreover, the liquid crystal display device 140 is interposed between the microlens array 130 and the polarizer 122.

The liquid crystal display device 140 has a screen size of 2.4 inches diagonal (vertical: 49.0 mm, horizontal: 36.7 mm). The pixels, or the minimum displaying units of the liquid crystal display device 140, are disposed in a stripe array of 240 horizontal pixels (R,G,B)×320 vertical pixels. The pixel pitches are 0.153 mm along the vertical direction, and 0.051 mm along the horizontal direction.

The liquid crystal display device 140 includes an active matrix substrate 150, a counter substrate 170, and a liquid crystal layer 160 interposed between the active matrix substrate 150 and the counter substrate 170. The liquid crystal layer 160 is sealed between the active matrix substrate 150 and the counter substrate 170, and includes liquid crystal molecules having a positive anisotropy of dielectric constant, for example.

The active matrix substrate 150 includes a transparent glass substrate 151, reflection electrodes 152 provided on the transparent glass substrate 151, and a transparent electrode 153 provided on the transparent glass substrate 151. Transmission apertures 154 are provided in the portions of the active matrix substrate 150 where the reflection electrodes 152 are not provided. A driving circuit (not shown) for supplying voltages for changing the orientation states of the liquid crystal molecules is connected to the transparent electrode 153. As the driving circuit drives the transparent electrode 153, the orientations of the liquid crystal molecules are controlled, whereby the intensity of the light which is transmitted through the liquid crystal layer 160 is controlled. Moreover, a plurality of thin film transistors (not shown) are provided in a matrix shape on the active matrix substrate 150, each thin film transistor controlling the charges of the reflection electrodes 152 and the transparent electrode 153. Moreover, the transparent glass substrate 151 has the microlens array 130 provided thereon.

Figure 6:
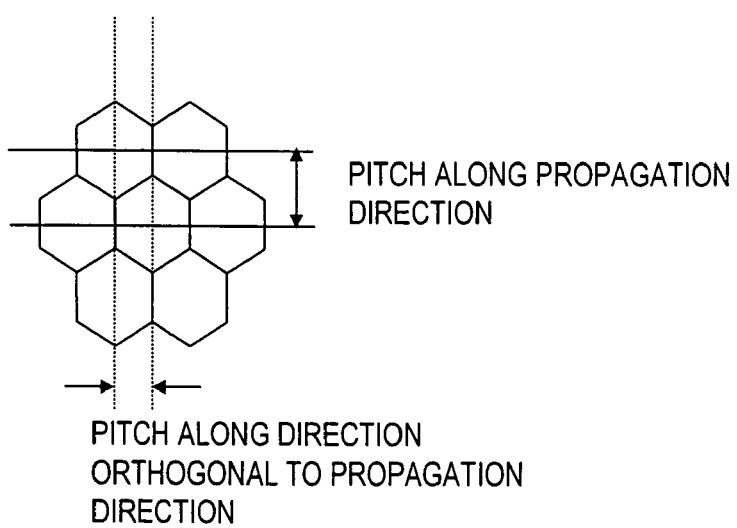
FIG. 6 A schematic diagram showing the positioning of a microlens array in an embodiment of a liquid crystal display apparatus according to the present invention.

The microlens array 130 includes a plurality of spherical lenses having a curvature of 80 μm. The spherical lenses are formed by applying a transparent acrylic or epoxy-type resin having a refractive index of 1.51 on the transparent glass substrate 151, and then processing it into a pattern. As shown in FIG. 6, the spherical lenses are disposed in a general delta array. The pitches of the spherical lenses are 76.5 μm along the propagation direction in which the light is propagated in the light guiding member 103 of the backlight unit 110, and 51 μm along a direction lying orthogonal to the propagation direction and in the plane of the light guiding member 103.

FIG. 5 is referred to again. The counter substrate 170 includes a transparent glass substrate 171 and a transparent electrode 172 which is formed on the transparent glass substrate 171.

Each transmission aperture 154 defined by the transparent electrode 153 has a circular shape with a diameter of 0.042 mm, and the transmission apertures 154 are disposed so as to correspond to the centers of the spherical lenses of the microlens array 130 shown in FIG. 6.

Moreover, the thickness of the active matrix substrate 150 is adjusted so that the distance from each transmission aperture 154 to the apex of each spherical lens of the microlens array 130 is 220 μm.

In the liquid crystal display apparatus 100 of the present embodiment, light having hardly any bright-dark fringes occurring therein enters the microlens array 130, so that the liquid crystal display apparatus 100 can perform displaying without causing moiré fringes.

Hereinafter, a comparison will be made between the liquid crystal display apparatus according to the present invention and a liquid crystal display apparatus according to Comparative Example.

Figure 15:
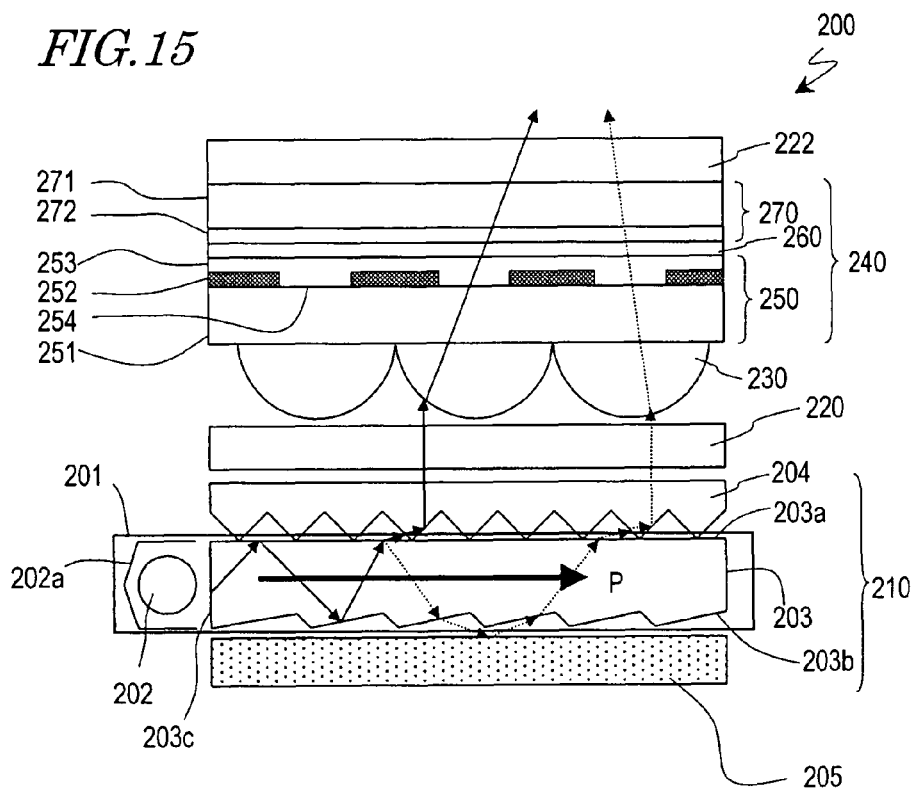
FIG. 15 A schematic cross-sectional view showing a liquid crystal display apparatus according to Comparative Example.

FIG. 15 is a schematic cross-sectional view of a liquid crystal display apparatus 200 according to Comparative Example. The liquid crystal display apparatus 200 differs from the liquid crystal display apparatus 100 shown in FIG. 5 in that the reflector 205 has a rectangular cross section.

A backlight unit 210 of the liquid crystal display apparatus 200 has a construction similar to that of the backlight unit 310 described with reference to FIG. 16(a), and the reflector 205 of the backlight unit 210 has a rectangular solid shape.

The optical characteristics of the liquid crystal display apparatus of the present embodiment and the liquid crystal display apparatus of Comparative Example are shown in Table 1. As shown in Table 1, in accordance with the liquid crystal display apparatus of the present embodiment, moiré fringes can be prevented while maintaining substantially the same luminance as the luminance of the liquid crystal display apparatus of Comparative Example.

TABLE 1

|  | Luminance | Moiré Fringes |
| --- | --- | --- |
| Comparative Example | 100 | YES |
| Present Embodiment | 95 | NO |

Thus, in accordance with the backlight unit 110 of the present embodiment, both the first prism slopes 104a and the second prism slopes 104b of the prism sheet 104 contribute to emission of light in the surface normal direction, whereby bright-dark fringes can be prevented. Since bright-dark fringes which would cause moiré do not occur, the liquid crystal display apparatus 100 can adequately perform displaying.

Note that, in the liquid crystal display apparatus 200 of Comparative Example, moiré fringes could be eliminated by broadening the interspace between the prism sheet 204 and the microlens array 230. However, broadening the interspace between the prism sheet 204 and the microlens array 230 is not preferable because the thickness of the liquid crystal display apparatus 200 would become thicker than practical thicknesses.

Note that the backlight unit according to the present invention is not limited to the backlight unit which been described with reference to FIG. 1 to FIG. 4.

Figure 7:
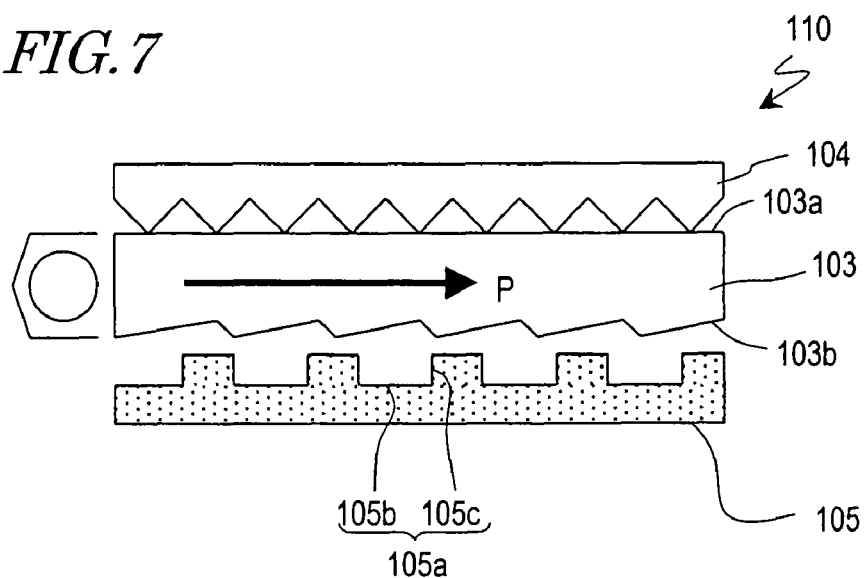
FIG. 7 A schematic cross-sectional view of another embodiment of a backlight unit according to the present invention.

In another embodiment of the backlight unit 110 according to the present invention, as shown in FIG. 7, the reflection surface 105a of the reflector 105 is not tilted with respect to the propagation direction P. Specifically, the normal direction of the first reflection surfaces 105b of the reflector 105 is perpendicular to the propagation direction P, whereas the normal direction of the second reflection surfaces 105c of the reflector 105 is parallel to the propagation direction P.

In this case, too, as has been described with reference to FIG. 4(c) and FIG. 4(d), light which strikes the reflector 105 is reflected by the first reflection surfaces 105b to become light having a component in the direction toward the rear face 103b of the light guiding member 103, and is reflected by the second reflection surfaces 105c to become light having a component in the second direction.

Figure 8:
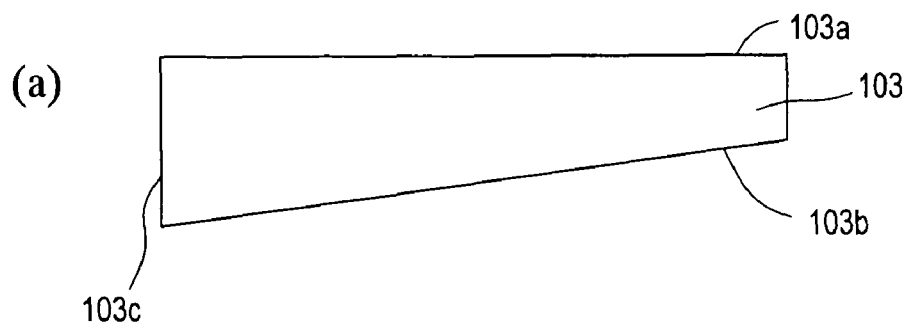
FIG. 8 (a) is a schematic cross-sectional view of a light guiding member in still another embodiment of a backlight unit according to the present invention; and (b) is a schematic cross-sectional view of a light guiding member in still another embodiment of a backlight unit according to the present invention.
Figure 8:
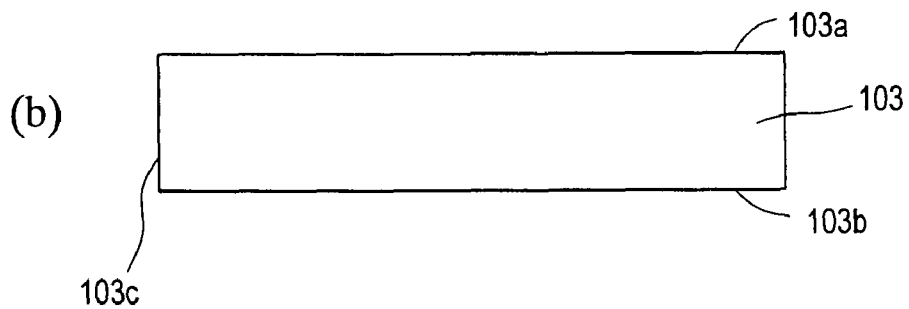

Note that the cross-sectional shape of the light guiding member 103 is not limited to the shape shown in FIG. 1(a) and FIG. 7. In still another embodiment of the backlight unit according to the present invention, the light guiding member 103 has a substantially wedge-shaped cross section, as shown in FIG. 8(a). Generally speaking, there is a tendency that the intensity of the light emitted from the front face 103a of the light guiding member 103 becomes greater toward the light source 102. When the light guiding member 103 has a wedge-shaped cross section, the intensity of the light emitted from the front face 103a of the light guiding member 103 can be made uniform.

In still another embodiment of the backlight unit according to the present invention, as shown in FIG. 8(b), the light guiding member 103 is a substantially rectangular solid, such that the light guiding member 103 has a rectangular cross section. In this case, the angle between the normal direction of the rear face 103b of the light guiding member 103 and the propagation direction is 90°.

Note that, although the light source 102 for emitting light for the light guiding member 103 is a linear light source in the backlight unit 110 which has been described with reference to FIG. 1(b), the light source 102 in the backlight unit 110 according to the present invention is not limited thereto.

Figure 9:
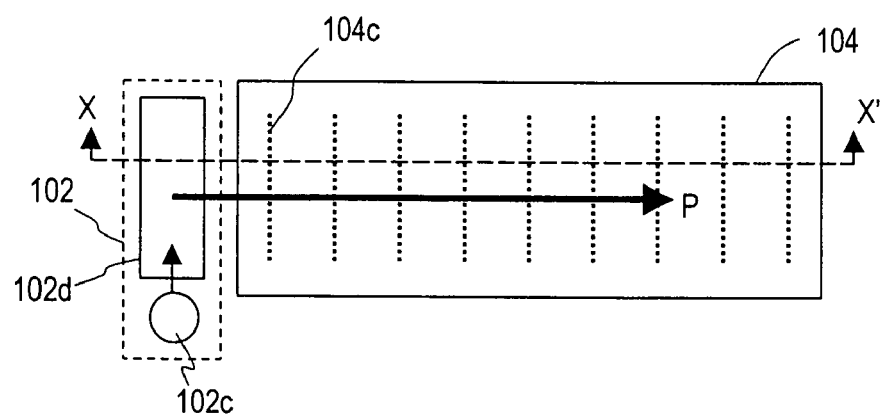
FIG. 9 (a) is a schematic plan view of still another embodiment of a backlight unit according to the present invention; and (b) is a cross-sectional view taken along line X-X' in (a).
Figure 9:
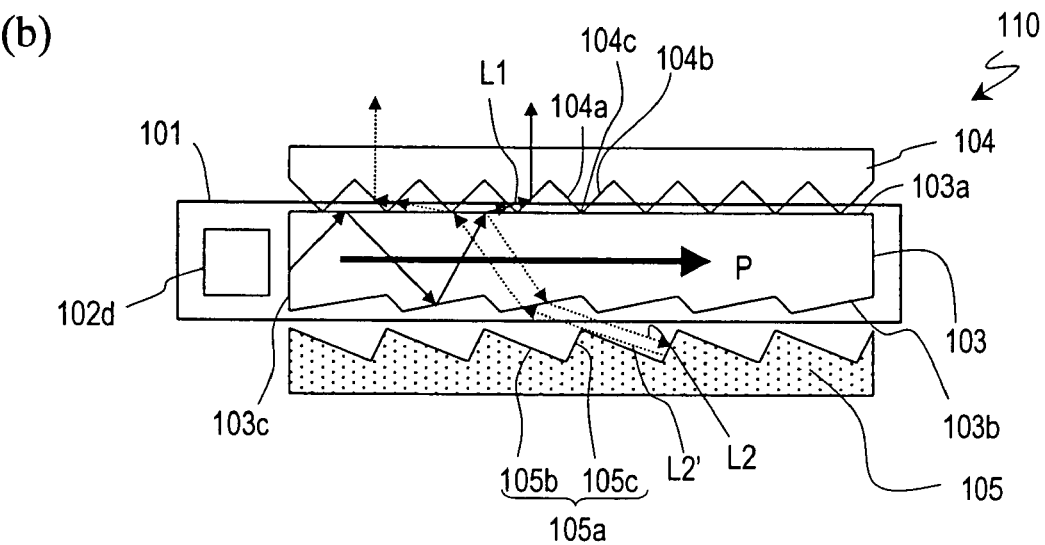

In still another embodiment of the backlight unit 110 according to the present invention, as shown in FIG. 9(*a*) and FIG. 9(*b*), the light source 102 has a point light source 102*c* and a linear light guiding member 102*d*. In this case, light emitted from the point light source 102*c* enters the linear light guiding member 102*d*, and light from the linear light guiding member 102*d* enters the light guiding member 103.

Figure 10:
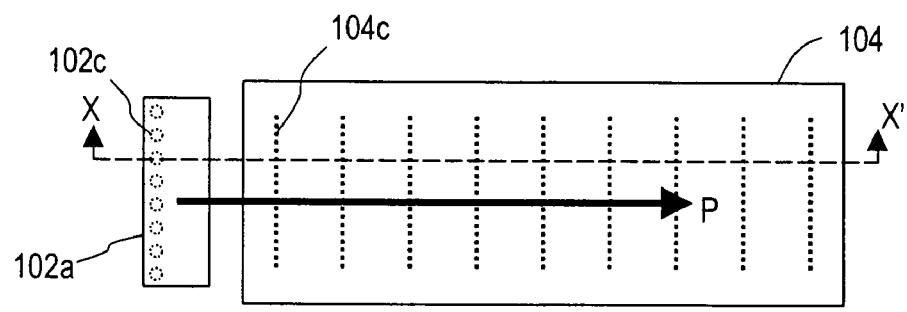
FIG. 10 (a) is a schematic plan view of still another embodiment of a backlight unit according to the present invention; and (b) is a cross-sectional view taken along line X-X' in (a).
Figure 10:
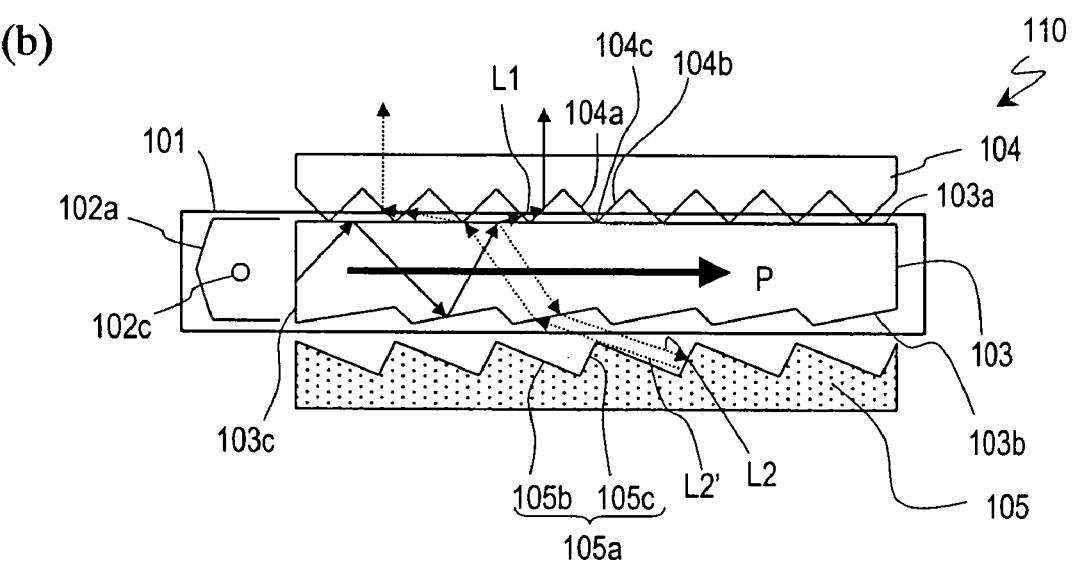

In still another embodiment of the backlight unit 110 according to the present invention, as shown in FIG. 10(*a*) and FIG. 10(*b*), the light source is a plurality of point light sources 102*c*.

Figure 11:
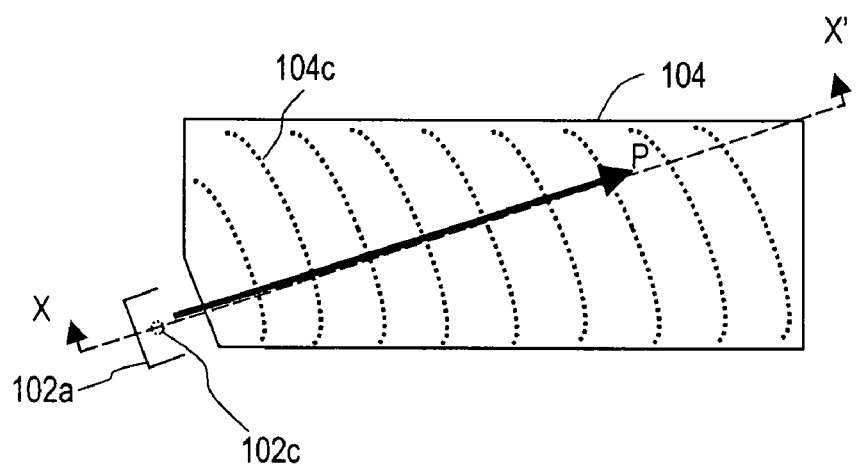
FIG. 11 (a) is a schematic plan view of still another embodiment of a backlight unit according to the present invention; and (b) is a cross-sectional view taken along line X-X' in (a).
Figure 11:
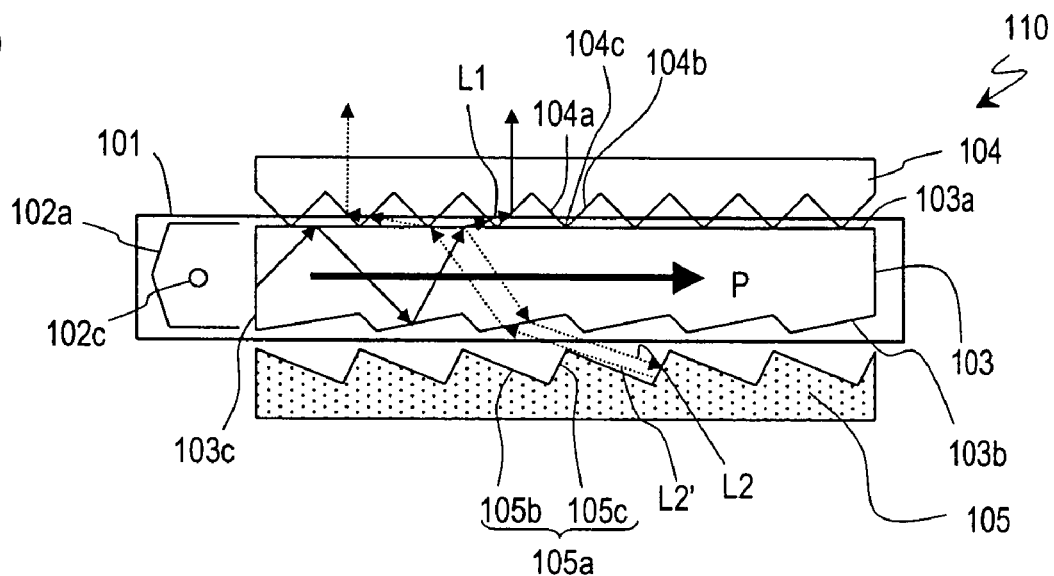

In still another embodiment of the backlight unit 110 according to the present invention, as shown in FIG. 11(*a*) and FIG. 11(*b*), one corner of the light guiding member 103 is beveled, and the point light source 102*c* is disposed near the beveled portion of the light guiding member 103. The point light source 102*c* is oriented diagonally from the beveled portion of the light guiding member 103, so that the light guiding member 103 propagates light from the point light source 102*c* in a propagation direction P. The direction in which the ridges 104*c* of the prism sheet 104 extend intersects the propagation direction P, and is preferably substantially orthogonal thereto. Each of the first reflection surfaces 105*b* and the second reflection surfaces 105*c* of the sloped reflector 105 is a rectangular face which is substantially parallel to the direction in which the ridges 104*c* of the prism sheet 104 extend.

Figure 12:
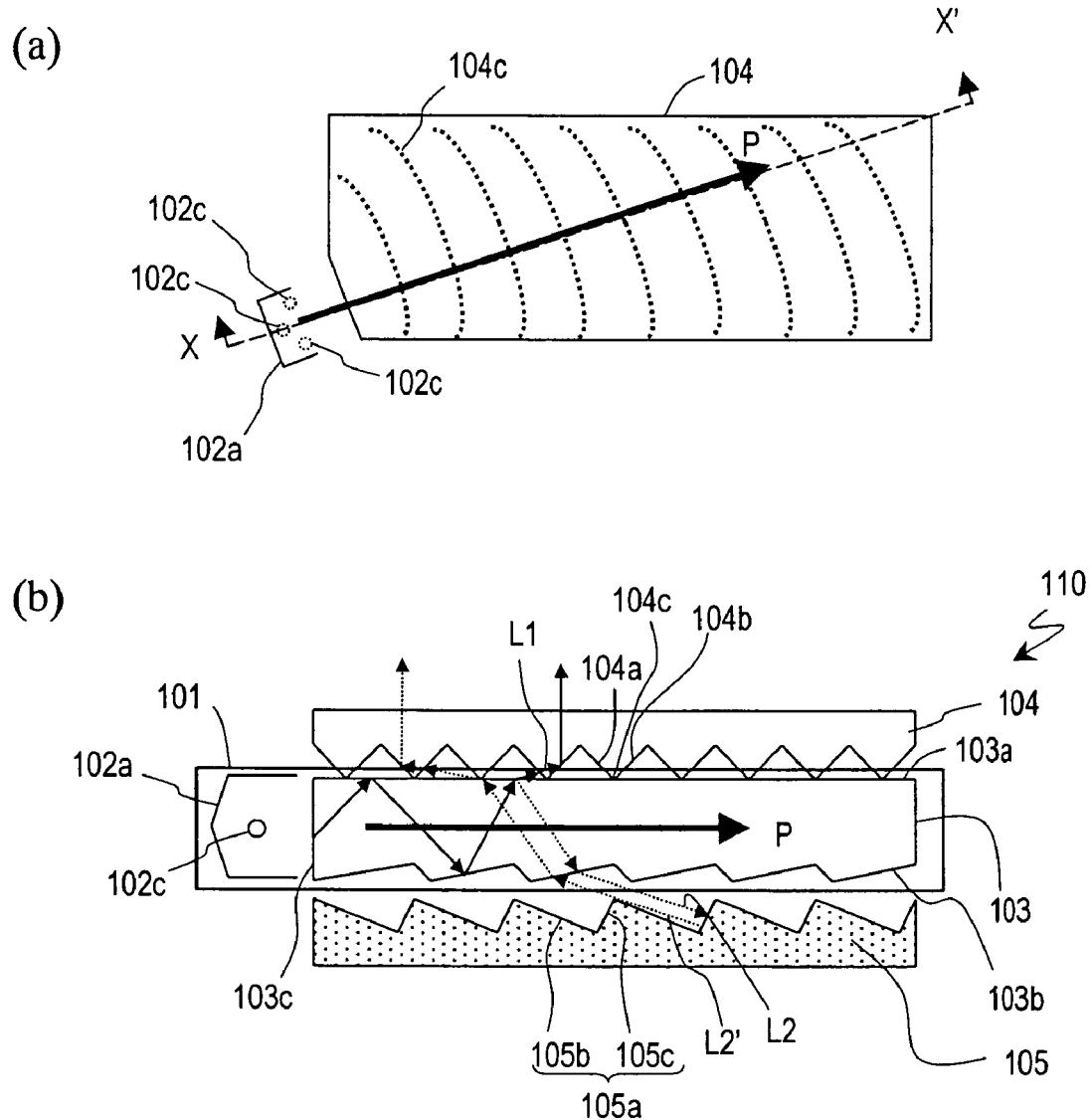
FIG. 12 (a) is a schematic plan view of still another embodiment of a backlight unit according to the present invention; and (b) is a cross-sectional view taken along line X-X' in (a).

In still another embodiment of the backlight unit 110 according to the present invention, as shown in FIG. 12(*a*) and FIG. 12(*b*), a plurality of point light sources 102*c* are provided. The light guiding member 103 is beveled at one corner, and the plurality of point light sources 102*c* are disposed near the beveled portion of the light guiding member 103. As a whole, the plurality of point light sources 102*c* are oriented diagonally from the beveled portion of the light guiding member 103, so that the light guiding member 103 propagates light from the plurality of point light sources 102*c* in a propagation direction P. Again, the direction in which ridges 104*c* of the prism sheet 104 extend intersects the propagation direction P, and is preferably substantially orthogonal thereto. Moreover, each of the first reflection surfaces 105*b* and the second reflection surfaces 105*c* of the sloped reflector 105 is a rectangular face which is substantially parallel to the direction in which the ridges 104*c* of the prism sheet 104 extend.

Although light enters from one side of the light guiding member 103 in the above descriptions, the present invention is not limited thereto.

Figure 13:
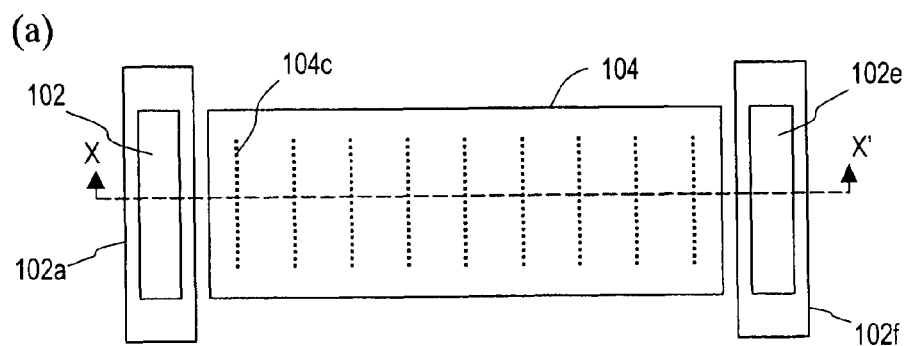
FIG. 13 (a) is a schematic plan view of still another embodiment of a backlight unit according to the present invention; and (b) is a cross-sectional view taken along line X-X' in (a).
Figure 13:
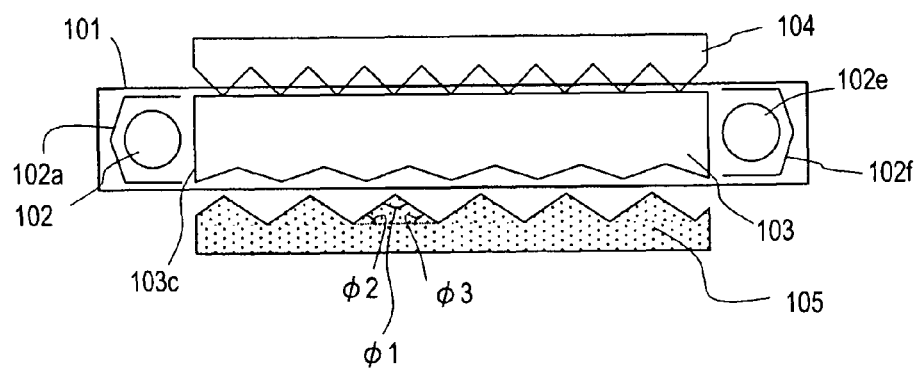

In still another embodiment of the backlight unit 110 according to the present invention, as shown in FIG. 13(*a*), two light sources 102 and 102*e*, each of which is a linear light source, are disposed on both side faces of a light guiding member 103. Herein, as shown in FIG. 13(*b*), a reflection surface 105*a* of a sloped reflector 105 is formed symmetrically so that a base angle φ2 and a base angle φ3 are equal, and the light guiding member 103 is also formed symmetrically.

If the propagation direction of the light from the light source 102 were to be conveniently referred to as a first propagation direction and the propagation direction of the light from the light source 102*e* a second propagation direction, then the second propagation direction would be the opposite direction to the first propagation direction. If the intensity of the light emitted from the light source 102 is the same as the intensity of the light emitted from the light source 102*e*, the intensity of the light having a component in the first propagation direction, out of the light emitted from the light guiding member 103 toward the prism sheet 104, is the same as the intensity of the light having a component in the second propagation direction. Alternatively, the light source 102 may be formed so as to surround the perimeter of the light guiding member 103.

Figure 14:
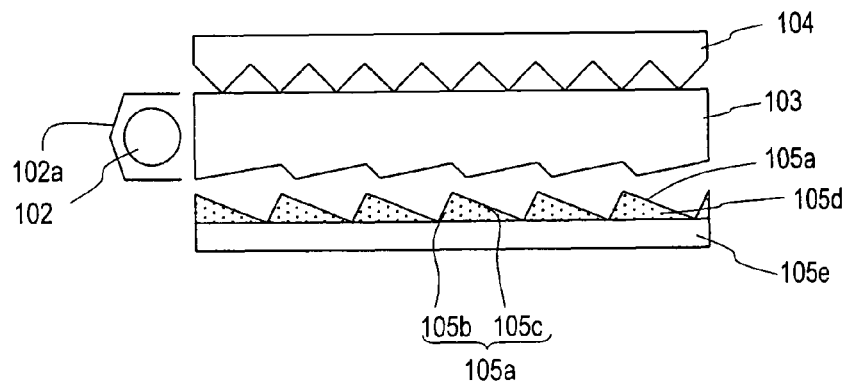
FIG. 14 A schematic cross-sectional view of still another embodiment of a backlight unit according to the present invention.

In still another embodiment of the backlight unit according to the present invention, as shown in FIG. 14, the sloped reflector 105 includes a plurality of reflection sections 105*d* and a substrate 105*e* on which the plurality of reflection sections 105*d* are provided. Each reflection section 105*d* has first reflection surfaces 105*b* and second reflection surfaces 105*c*, such that the alternately-disposed first reflection surfaces 105*b* and second reflection surfaces 105*c* form a reflection surface 105*a*. As the substrate 105*e*, any arbitrary substrate that is capable of affixing the reflection sections 105*d* can be used.

The sloped reflector 105 is formed in the following manner. A resin layer is formed on the substrate 105*e*, and slopes having a sawteeth cross section are formed on the resin layer. The slopes of the resin layer are formed by using a photolithography technique or a transfer technique. On the surface of the resin layer, a metallic reflection film having a high light reflectance, e.g., aluminum or silver, or a dielectric reflection film in which thin dielectric films having different refractive indices are alternately stacked is deposited, thus forming the oblique reflection section 105*c* having the reflection surface 105*a*.

Note that, a plurality of reflection sections 105*d* are provided in the backlight unit 110 shown in FIG. 14, there may only be one reflection section 105*d*. Moreover, the reflection sections 105*d* do not need to be provided on the substrate 105*e*.

Although the transflective type liquid crystal display apparatus 100 having the backlight unit 110 was illustrated in the above descriptions, the present invention is not limited thereto. The backlight unit 110 according to the present invention may be used in a transmission type liquid crystal display apparatus.

INDUSTRIAL APPLICABILITY

With a liquid crystal display apparatus having the backlight unit according to the present invention, moiré fringes due to bright-dark fringes can be prevented. Therefore, the liquid crystal display apparatus can be suitably used for mobile phones, mobile terminals, word processors, office automation (OA) devices such as laptop-type personal computers, various video devices, game devices, television receivers, and the like.

The invention claimed is:
1. A backlight unit comprising:
a light source for emitting light;
a light guiding member having a front face, a rear face, and an end face, the light guiding member receiving the light emitted from the light source at the end face and propagating the received light in a first direction;
a prism sheet disposed at the front face side of the light guiding member; and
a reflection section disposed at the rear face side of the light guiding member, wherein,
the reflection section has a reflection surface for reflecting light being emitted from the rear face of the light guiding member and having a component in the first direction, the light being reflected toward the rear face of the light guiding member as light having a component in a second direction, the second direction being an opposite direction to the first direction;

the light guiding member emits the light having the component in the first direction and the light having the component in the second direction from the front face toward the prism sheet;

wherein the rear face of the light guiding member and a front face of the reflection section both have sawtooth shaped surfaces that oppose each other; and wherein a pitch of apices of the sawtooth shaped surface of the rear surface of the light guiding member is approximately equal to a pitch of the front face of the reflection section.

2. The backlight unit of claim 1, wherein an area of the first reflection surface is greater than an area of the second reflection surface.

3. The backlight unit of claim 1, wherein, within the light emitted from the light guiding member toward the prism sheet, the intensity of the light having the component in the first direction is substantially the same as the intensity of the light having the component in the second direction.

4. A backlight unit comprising:

a light source for emitting light;

a light guiding member having a front face, a rear face, and an end face, the light guiding member receiving the light emitted from the light source at the end face and propagating the received light in a first direction;

a prism sheet disposed at the front face side of the light guiding member; and a reflection section disposed at the rear face side of the light guiding member, wherein, the reflection section has a reflection surface for reflecting light being emitted from the rear face of the light guiding member and having a component in the first direction, the light being reflected toward the rear face of the light guiding member as light having a component in a second direction, the second direction being an opposite direction to the first direction;

the light guiding member emits the light having the component in the first direction and the light having the component in the second direction from the front face toward the prism sheet;

wherein the rear face of the light guiding member and a front face of the reflection section both have sawtooth shaped surfaces that oppose each other; and wherein said prism sheet comprises apices which are oriented so as to face the light guiding member and the reflection section.

5. The backlight unit of claim 4, wherein an area of the first reflection surface is greater than an area of the second reflection surface.

6. The backlight unit of claim 4, wherein, within the light emitted from the light guiding member toward the prism sheet, the intensity of the light having the component in the first direction is substantially the same as the intensity of the light having the component in the second direction.

\* \* \* \* \*